United States Patent [19]

Ying et al.

[11] Patent Number: 4,789,484

[45] Date of Patent: Dec. 6, 1988

[54] TREATMENT OF ELECTROLESS NICKEL PLATING BATHS

[75] Inventors: Wei-chi Ying, Grand Island; Robert R. Bonk, Tonawanda, both of N.Y.

[73] Assignee: Occidental Chemical Corporation, Niagara Falls, N.Y.

[21] Appl. No.: 158,952

[22] Filed: Feb. 22, 1988

[51] Int. Cl.$^4$ .............................................. C02F 1/72
[52] U.S. Cl. ........................... 210/721; 204/DIG. 13; 210/724; 210/726; 210/906; 210/912; 423/140; 423/305
[58] Field of Search ............... 204/DIG. 13; 210/721, 210/724, 726, 912, 906; 423/140, 304, 305

[56] References Cited

U.S. PATENT DOCUMENTS

| | | | |
|---|---|---|---|
| 3,770,630 | 11/1973 | Kamperman | 423/140 |
| 4,009,101 | 2/1977 | Hayashi | 210/665 |
| 4,265,866 | 5/1981 | Arzoumanidis et al. | 423/304 |
| 4,332,687 | 6/1982 | Daignault et al. | 210/724 |
| 4,380,531 | 4/1983 | Wisnouskas et al. | 423/304 |

FOREIGN PATENT DOCUMENTS

| | | | |
|---|---|---|---|
| 53-133962 | 11/1978 | Japan | 210/726 |
| 1031911 | 7/1983 | U.S.S.R. | 210/912 |

*Primary Examiner*—Peter Hruskoci
*Attorney, Agent, or Firm*—James F. Tao; William G. Gosz

[57] ABSTRACT

A process for removing nickel and phosphorus species from a spent electroless nickel plating solution is described. This process involves an initial precipitation of phosphite values from the plating solution, followed by oxidation of hypophosphite and remaining phosphite to phosphate values, and the final removal of phosphate and nickel by lime precipitation. The treated plating solution is then separated from the precipitants, such as by filtration, and preferbly contain less than 1 milligrams/liter of nickel and/or total phosphorus species. This process is a cost effective method for treating spent electroless nickel plating solutions which is readily adaptable for on-site use.

7 Claims, No Drawings

TREATMENT OF ELECTROLESS NICKEL PLATING BATHS

BACKGROUND OF THE INVENTION

The present invention relates to a process for treating spent electroless nickel plating solutions to remove objectionable contaminants from the solution such as nickel and phosphorus species. The process of this invention represents a low cost alternative to present technology which frequently requires off-site disposal to satisfy existing and projected stricter environmental standards.

Electroless nickel plating is a popular commercial technique for depositing nickel coatings on a suitably treated surface by the controlled chemical reduction of nickel ions. The nickel coating catalyzes the reduction reaction, and the deposition of nickel continues as long as the substrate remains in contact with the electroless nickel plating solution. Typical applications of electroless nickel coatings include parts which are difficult to plate such as valves and machine tools, as well as larger objects such as caustic railcars and barges. The physical properties of the coated surface such as coating uniformity, corrosion and wear resistance, lubricity and ductility compare favorably with electroplated nickel surfaces and are more economical for industrial applications.

Electroless nickel plating baths are mixtures of several chemicals each performing specific functions. A source of nickel ions, such as nickel chloride or sulfate is required. Additional components include reducing agents to supply electrons for the reduction of free nickel ions, complexing agents to control the amount of free nickel ions in solution, buffering agents to resist the pH changes associated with the nickel reduction reaction, accelerators to enhance the speed of the reaction, and inhibitors to moderate the deposition process. The electroless nickel plating bath is normally maintained at a temperature in the range of from about 85° C. to about 95° C.

Typical ingredients of electroless nickel plating solutions include, as a reducing agent, sodium hypophosphite, complexing and/or buffering agents such as citric acid, acetic acid, hydroxyacetic acid, succinic acid, lactic acid, malic acid, propionic acid, and aminoacetic acids, accelerators such as succinic acid, and inhibitors such as thiourea or lead nitrate.

The major types of wastewater resulting from electroless nickel process are spent electroless nickel plating solutions, stripping solutions, and rinse waters. Stripping solutions employ nitric acid to remove nickel from improperly plated surfaces and to remove nickel deposits from the surfaces of plating equipment. The spent plating solutions contain relatively large amounts of total soluble nickel species ($Ni^{+2}$), as well as reducing and complexing agents.

The on-site treatment of spent electroless nickel plating solutions is required to meet effluent discharge limits which can be as low as 1 mg/l of nickel ($Ni^{+2}$) and/or total phosphorus. In practice, this is difficult to achieve due to the presence of high concentrations of complexing agents in the spent solution. Off-site disposal is very expensive, and this expense frequently renders this alternative economically unfeasible.

Existing treatment methods for removing nickel species from industrial waste waters generally involve either the reduction of soluble nickel to elemental nickel, the precipitation of insoluble nickel compounds, or the separation of the nickel by adsorption, electrostatic force, applied electrical potential, and hydraulic or mechanical pressure. The precipitation of ionic nickel as nickel hydroxide is frequently the most convenient and/or least expensive alternative.

Typical spent electroless nickel plating solutions also contain high concentrations of hypophosphite and phosphite species. As used in this specification and claims, the term "hypophosphite" refers to the concentration of those phosphorus species in the +1 oxidation state, the term "phosphite" refers to the concentration of phosphorus species in the +3 oxidation state, and "phosphate" refers to the concentration of phosphorus species in the +5 oxidation state.

The phosphite species are produced by the oxidation of sodium hypophosphite when soluble nickel is reduced to elemental nickel in the electroless nickel plating process. Although hypophosphite species, and to a lesser extent phosphite species, are soluble in water, phosphate species can be removed by precipitation using a suitable precipitating agent such as lime, ferric chloride, or alum to produce insoluble metal phosphate species. Lime is the preferred precipitating agent.

The one-step methods for removing hypophosphite and phosphite species from spent electroless nickel plating solutions are either ineffective, i.e. such as the use of lime precipitation, or too costly, i.e. by using ion exchange methods for instance.

An effective treatment process for spent electroless nickel plating solutions must also address, in addition to economics, the problem of treating the wide variety of chemicals encountered in typical commercial electroless nickel plating baths.

SUMMARY OF THE INVENTION

In accordance with the present invention, an improved process for removing nickel and phosphorus species from spent electroless nickel plating solutions comprises the following steps:

(A) contacting the spent plating solution with a precipitating agent to precipitate phosphite species, (B) removing the precipitated phosphite species from the plating solution, (C) contacting the treated plating solution from step (B) with an oxidizing agent to oxidize hypophosphite and phosphite species to the corresponding phosphate species, (D) contacting the oxidized plating solution with a precipitating agent to precipitate phosphate and nickel species, and (E) separating the precipitated phosphate and nickel species from the treated solution of step (D) to produce an environmentally acceptable spent plating solution.

DESCRIPTION OF THE PREFERRED EMBODIMENTS

The spent electroless nickel plating solutions which are treated according to the process of this invention contain a variety of chemicals used in the plating process such as sodium hypophosphite, a common reducing agent, organic acids employed as complexing and/or buffering agents, such as citric acid, acetic acid, hydroxyacetic (glycolic) acid, succinic acid, lactic acid, malic acid, propionic acid, and amino-acetic acid, and thiourea or lead as inhibitors.

The presence of this wide variety of chemicals in the spent plating solution, as well as the variability of plating conditions from one bath to another, further complicates the objective of removing pollutants from the spent solution to render it environmentally acceptable for disposal. Regulations presently in existance or under consideration by the Environmental Protection Agency mandate effluent discharge limits of as low as 1 mg/l for soluble nickel and/or total phosphorus. Achieving these stringent limitations is often complicated by the presence of complexing agents in the bath such as ammonium citrate which inhibit the removal of nickel from the solution.

The spent plating solution of this invention is contacted with a precipitating agent to remove phosphite species as the first stage of the treating process. Precipitating agents of choice include soluble calcium salts, such as lime (calcium oxide) or calcium hydroxide. These precipitating agents are all capable of precipitating insoluble phosphite salts which can be readily separated from the plating solution. The amount of precipitating agent added to the plating solution will vary with the composition of the solution. In general, when the precipitating agent is lime, sufficient lime is added to the solution to raise the pH to about 10 and to cause precipitation of phosphite species. As much as 95% removal of phosphite from the solution in the form of $CaHPO_3$ is observed under these conditions. Preferably, a major portion, i.e. at least 50% or more, of the total phosphite species are removed from the solution at this stage. It is also possible to precipitate nickel during this stage of the process, depending on the type and concentration of the complexing agent employed in the bath.

After separation of the precipitated phosphites from the plating solution, the solution is contacted with an oxidizing agent, such as potassium permanganate in order to oxidize hypophosphite and phosphite species to phosphate species. Potassium permanganate has been found to be extremely effective for this purpose, and complete oxidation in about one hour at room temperature using this reagent has been achieved. Other oxidizing agents such as persulfate and hydrogen peroxide require much longer oxidation times, while air xxidation is almost completely ineffective. Oxidation using potassium permanganate is faster at a pH of 10 or more, and this condition is therefore preferred in the practice of this invention.

Following oxidation, the plating solution is once again contacted with a precipitating agent to precipitate phosphate and nickel species from the solution at a basic pH of about 10. The same precipitating agents may be used for treatment both prior to and after oxidation, with the preferred precipitating agent once again being lime. During this stage of the treatment process, both the nickel and phosphate species are converted to the corresponding insoluble compounds such as calcium phosphate and nickel hydroxide. It has been found that caustic soda, while effective in removing nickel as nickel hydroxide from spent plating baths which contain acetic acid, is ineffective in removing nickel from baths containing citrates. In particular, ammonium citrate has been found to be a particularly powerful complexing agent which can inhibit removal of nickel from the solution. The presence of organic acids in the spent plating solution also adversely affects the oxidation rate for the convertion of hypophosphite and phosphite species to phosphate species.

The plating solution with the phosphate and nickel precipitates removed has a substantially reduced content of soluble nickel and total phosphorus, and is therefore suitable for direct discharge into the environment without further treatment. Preferably, the treated solution has a total phosphorus and soluble nickel content of less than 1 mg/l for each of these species. The spent bath can be discharged directly at the situs of the plating operation without the necessity for transporting waste materials to off-site disposal facilities. This represents a significant cost savings to the operator of the plating facility as is readily appreciated by those skilled in this art.

The following examples are intended to illustrate various embodiments and advantages of the present invention without limiting it thereby.

EXAMPLE 1

A 30 milliter sample was obtained of a spent electroless nickel plating solution generated by a plating bath containing sodium hypophosphate as a reducing agent. The spent solution contained 0.4M of acetic acid as a complexing agent, 1.8 grams/liter $Ni^{+2}$, 3.7 grams/liter of hypophosphite and 26.8 grams/liter of phosphite species. The initial pH of the solution was 3.9 and the total organic carbon content was 10.1 grams/liter. 1.52 grams of lime was added to the sample, and the mixture was filtered after several hours under gentle stirring to induce precipitation. The $Ni^{+2}$ and total phosphorus of the filtrate was recorded as 1.0 milligrams/liter and 2480 milligrams/liter respectively. 0.83 grams of $KMnO_4$ was added to the filtrate, and after allowing several hours for complete oxidation, 0.71 grams of lime was again added to remove $Ni^{+2}$ and phosphate species by precipitation. The final $Ni^{+2}$ and total phosphorus concentration was recorded as less than 0.2 milligrams/liter and 1.7 milligrams/liter respectively.

EXAMPLE 2

A 30 milliter sample of the spent electroless nickel plating solution of Example 1 was subjected to a two-stage treatment for purposes of comparison. 2.53 grams of $KMnO_4$ was added to the sample, and, after several hours allowing for complete oxidation, 1.75 grams of lime was added to remove $Ni^{+2}$ and phosphate species by precipitation. The oxidation was conducted at a pH of 10, attained by adding 6N NaOH to the sample. A final $Ni^{+2}$ and total P concentration of less than 0.2 milligrams/liter and 30 milligrams/liter, respectively, was recorded.

EXAMPLE 3

Following the procedure of Example 1, a 30 milliter sample of spent electroless nickel plating solution having an initial pH of 3.5 was obtained. The bath composition contained 0.3M of ammonium citrate as a complexing agent, 7.3 grams/liter of $Ni^{+2}$, 5.4 grams/ liter of hypophosphite species, 20.8 grams/liter of phosphite species, and had a total organic carbon content of 23.9 grams/liter. The spent plating solution was subjected to a three-stage treatment process as in Example 1 using 2.03 grams of lime as a first-stage precipitating agent. The $Ni^{+2}$ and total phosphorus content of the filtrate after the first stage was recorded as 288 milligrams/liter and 3870 milligrams/liter, respectively. After the addition of 0.69 grams of $KMnO_4$ and then 1.11 grams of lime as a precipitating agent, the final $Ni^{+2}$ and total phosphorus concentration was recorded as 72 milligrams/liter and 0.8 milligrams/liter, respectively.

EXAMPLE 4

A 30 milliter sample of the spent electroless nickel plating solution of Example 3 was subjected to a two-stage treatment for purposes of comparison. 2.00 Grams of $KMnO_4$ was added to the sample, and, after several hours allowing for complete oxidation, 3.40 grams of lime was added to remove $Ni^{+2}$ and phosphate species by precipitation. The oxidation was conducted at a pH of 10, attained by adding 6N NaOH to the sample. A final $Ni^{+2}$ and total P concentration of 1500 milligrams/liter and 7.5 milligrams/liter, respectively, was recorded.

EXAMPLE 5

Following the procedure of Example 1, a 30 milliter sample of spent electroless nickel plating solution having an initial pH of 5.0 was obtained. The bath composition contained 0.3M of ammonium citrate and malic acid as complexing agents, 3.2 grams/liter of $Ni^{+2}$, 8.2 grams/liter of hypophosphite species, 57.2 grams/liter of phosphite species, and a total organic carbon content of 11.6 grams/liter. The spent plating solution was subjected to a three-stage treatment process as in Example 1 using 3.24 grams of lime as a first-stage precipitating agent. The $Ni^{+2}$ and total phosphorus content of the filtrate after the first-stage was recorded as 130 milligrams/liter and 4240 milligrams/liter, respectively. After the addition of 1.68 grams of $KMnO_4$ and 1.22 grams of lime as a precipitating agent, the final $Ni^{+2}$ and total phosphorus concentration was recorded as less than 0.2 milligrams/liter and 6.2 milligrams/liter, respectively.

EXAMPLE 6

A 30 milliliter. sample of the spent electroless nickel plating solution of Example 5 was subjected to a two-stage treatment for purposes of comparison. 5.62 grams of $KMnO_4$ was added to the sample, and, after several hours allowing for complete oxidation, 3.81 grams lime was added to remove $Ni^{+2}$ and phosphate values by precipitation. tion. The oxidation was conducted at a pH of 10, obtained by adding 6N NaOH to the sample. The final $Ni^{+2}$ and total P concentration of less than 0.2 milligrams/ltter and 23 milligrams/liter, respectively, was recorded.

While particular embodiments of the invention have been described herein, the modifications and variations thereof will occur to those skilled in the art. It is to be understood, therefore, that the appended claims are intended to cover such modifications and variations which are within the scope and spirit of this invention.

What is claimed is:

1. A process for removing nickel and phosphorus values including hypophosphite and phosphite species from spent electroless nickel plating solutions comprises the steps of:
   (a) contacting the spent plating solution with an effective amount of lime or calcium hydroxide to precipitate said phosphit species,
   (b) removing the precipitated phosphite species from the plating solution, wherein a major position of the total phosphite species present in the spent plating solution are removed,
   (c) contacting the treated plating solution of step (b) with an effective amount of potassium permanganate to convert said hypophosphite and phosphite species to phosphate species,
   (d) contacting the oxidized plating solution with an effective amount of lime or calcium hydroxide to precipitate said phosphate species and said nickel values, and
   (e) separating the precipitated phosphate species and nickel values from the treated solution of step (d) to produce an environmentally acceptable spent plating solution which is suitable for disposal.

2. The process of claim 1 wherein the pH of the solution in step (a) is about 10.

3. The process of claim 1 wherein the precipitating agent in step (a) is lime.

4. The process of claim 1 wherein the precipitating agent in step (d) is lime.

5. The process of claim 1 wherein the treated plating solution of step (e) contains less than 1 milligrams/liter of nickel or total phosphorus species.

6. The process of claim 1 which is conducted at the situs of the plating process.

7. The process of claim 1 wherein the spent plating solution contains ammonium citrate.

* * * * *